(12) United States Patent
Las et al.

(10) Patent No.: US 12,409,722 B2
(45) Date of Patent: Sep. 9, 2025

(54) SERVICE MEMBER FOR A VEHICLE COOLING MODULE AND A VEHICLE COOLING MODULE WITH THE SERVICE MEMBER

(71) Applicant: Valeo Autosystemy Sp. z o.o., Skawina (PL)

(72) Inventors: Piotr Las, Skawina (PL); Michal Indyka, Skawina (PL)

(73) Assignee: Valeo Autosystemy Sp. z o.o., Przemyslowa (PL)

( * ) Notice: Subject to any disclaimer, the term of this patent is extended or adjusted under 35 U.S.C. 154(b) by 247 days.

(21) Appl. No.: 17/918,342

(22) PCT Filed: Apr. 9, 2021

(86) PCT No.: PCT/EP2021/059295
§ 371 (c)(1),
(2) Date: Oct. 12, 2022

(87) PCT Pub. No.: WO2021/213816
PCT Pub. Date: Oct. 28, 2021

(65) Prior Publication Data
US 2023/0147303 A1 May 11, 2023

(30) Foreign Application Priority Data
Apr. 20, 2020 (EP) .................................... 20461530

(51) Int. Cl.
*B60K 1/04* (2019.01)
*B60K 11/04* (2006.01)

(52) U.S. Cl.
CPC .................................... *B60K 11/04* (2013.01)

(58) Field of Classification Search
CPC ......................................................... B60K 11/04
See application file for complete search history.

(56) References Cited

U.S. PATENT DOCUMENTS 3,795,274 A * 3/1974 Fieni ...................... F28F 9/002
165/122
4,148,505 A * 4/1979 Jensen ................ B62D 21/152
280/784

(Continued)

FOREIGN PATENT DOCUMENTS

CN 206510749 U 9/2017
DE 102009043794 A1 3/2011

(Continued)

OTHER PUBLICATIONS

European Patent Office, International Search Report and Written Opinion of corresponding International Application No. PCT/EP2021/059295, dated Jun. 8, 2021.

(Continued)

*Primary Examiner* — Jason D Shanske
*Assistant Examiner* — James J Triggs
(74) *Attorney, Agent, or Firm* — Valeo Autosystemy Sp. z o.o.

(57) ABSTRACT

A servicing member for a vehicle cooling module includes a first element with a bumper portion, a first fixing interface located on the first element for fixing to the vehicle module, a second element connected to the first element and a second fixing interface located on the second element for fixing the servicing member to a vehicle structure. The first element is connected with the second element by a connection portion adapted to controllably break upon imparting a predetermined force to the bumper portion. The first fixing interface includes a tongue portion adapted for releasable connection with a slot in the vehicle cooling module, the first fixing interface including a first side wall extending adjacent to the tongue portion between said tongue portion and the bumper portion so that a free space is created between the tongue portion and the first side wall.

14 Claims, 4 Drawing Sheets

(56) References Cited

U.S. PATENT DOCUMENTS

| | | | | |
|---|---|---|---|---|
| 4,766,968 A * | 8/1988 | Matsunaga | ............. | F16F 15/08 |
| | | | | 248/629 |
| 6,223,811 B1 * | 5/2001 | Kodumudi | ............. | F28F 9/002 |
| | | | | 165/41 |
| 7,117,927 B2 * | 10/2006 | Kent | ....................... | F28F 9/002 |
| | | | | 24/458 |
| 7,963,355 B2 * | 6/2011 | Mishima | ............... | B62D 21/152 |
| | | | | 280/784 |
| 8,122,988 B2 * | 2/2012 | Obayashi | ............... | B60K 11/04 |
| | | | | 180/68.6 |
| 9,146,061 B2 * | 9/2015 | Farlow | .................... | F28F 9/002 |
| 9,266,422 B2 * | 2/2016 | Narita | .................... | F02B 77/13 |
| 9,714,798 B2 * | 7/2017 | Kinder | ................. | F28D 1/0341 |

FOREIGN PATENT DOCUMENTS

| | | | | | |
|---|---|---|---|---|---|
| EP | | 1957346 B1 | | 6/2007 | |
| EP | | 2966393 A1 * | | 1/2016 | ............ B60K 11/04 |
| WO | | 2007065629 A1 | | 6/2007 | |

OTHER PUBLICATIONS

China Patent Office, Office Action (with English translation) and Search Report of corresponding Chinese Application No. 202180027241. 3, dated Jan. 24, 2025, 11 pages.

* cited by examiner

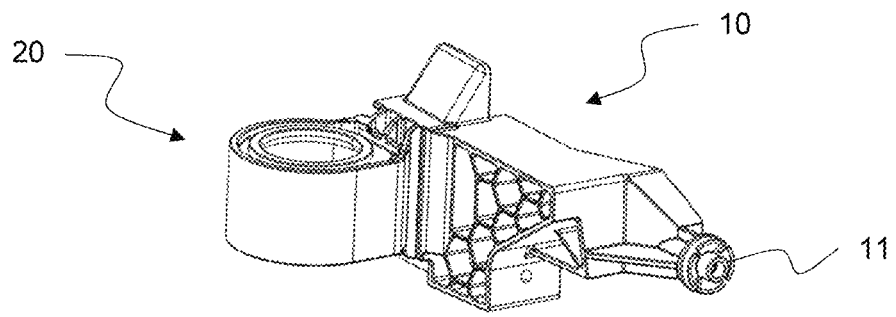
Fig. 2
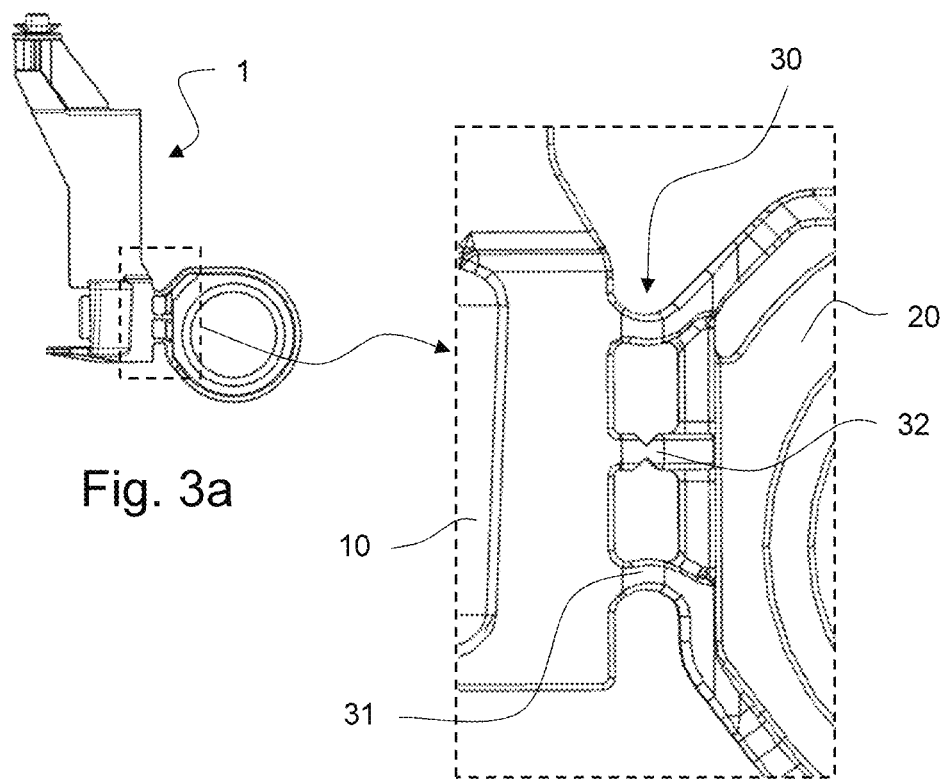
Fig. 3a
Fig. 3b

SERVICE MEMBER FOR A VEHICLE COOLING MODULE AND A VEHICLE COOLING MODULE WITH THE SERVICE MEMBER

CROSS-REFERENCE TO RELATED APPLICATIONS

This application is filed under 35 U.S.C. § 371 U.S. National Phase of International Application No. PCT/EP2021/059295 filed Apr. 9, 2021 (published as WO2021213816), which claims priority benefit to European Application No. 20461530.6 filed on Apr. 20, 2020, the disclosures of which are herein incorporated by reference in their entirety.

TECHNICAL FIELD

The invention concerns a service member for replacing a broken mounting assembly of a vehicle cooling module. The invention further relates to a vehicle cooling module with a service member and a combination thereof.

BACKGROUND OF THE INVENTION

Vehicles of all kinds, for example motor vehicles, passenger cars and trucks, have cooling components for a cooling system. Usually, cooling radiators are located at the front of the vehicle, behind the bumper. These are therefore often damaged during a head-on collision, even at low speeds. If the water tank or the core of the cooling element is damaged, the radiator is out of order and the vehicle cannot be driven to the nearest repair shop and must be towed away. In addition, if the water tank or, more generally, the cooling radiator is damaged, the radiator must be replaced with a new radiator, resulting in high repair costs.

It is already known from the state of the art to mount the radiator or more generally the vehicle cooling module on the vehicle with mounting assemblies. In the event of a frontal collision, these mounting assemblies break off and the radiator itself remains undamaged. After an accident, the mounting assembly must be replaced.

In known solutions, the vehicle cooling module is fitted with a separate plastic fixing element, e.g. a dovetail on successive cooling modules. In the event of an accident, this separate plastic fixing element is replaced by an identical part. This solution requires an additional part, i.e. the separate plastic fixing element, to be attached not only to one vehicle cooling module as a repair solution after an accident, but to all successive cooling modules. This means additional working time and thus additional costs.

There is a need for a service member, which can be easily attached to a vehicle cooling module after an accident, thus minimizing the costs for the repair. There is also a need for a vehicle cooling module that is mounted in such a way that in the event of a head-on collision the water tank will not leak and that is easy to repair with a service member.

BRIEF SUMMARY OF THE INVENTION

The object of the invention is, among others, a servicing member for a vehicle cooling module, comprising a first element with a bumper portion, a first fixing interface located on the first element for fixing to the vehicle module, a second element connected to the first element, a second fixing interface located on the second element for fixing the servicing member to a vehicle structure, wherein the first element is connected with the second element by a connection portion adapted to controllably break upon imparting a predetermined force to the bumper portion, wherein the first fixing interface comprises a tongue portion, the tongue portion being adapted for releasable connection with a slot in the vehicle cooling module, the first fixing interface comprising a first side wall extending adjacent to the tongue portion between said tongue portion and the bumper portion so that a free space is created between the tongue portion and the first side wall.

Preferably, wherein the tongue portion is of plate-like shape and rectangular cross-section.

Preferably, the tongue portion comprises a blocking section adapted for frictional fixing in a slot of a vehicle cooling module.

Preferably, the bumper portion is adapted to work along the impact axis, and the tongue portion extends along a tongue axis perpendicular to impact axis.

Preferably, the first side wall extends along an axis Yw perpendicular to the impact axis Xb and the tongue axis Zt.

Preferably, the service member further comprises a second side wall extending parallel to the first side wall on the opposite side of the tongue portion.

Preferably, the service member further comprises a top wall extending over the tongue portion when looked along an axis Yt going through the tongue portion parallel to the Yw axis.

Preferably, the top wall is inclined with respect to the tongue portion.

Preferably, the service member further comprises a bottom wall extending below the tongue portion when looked along an axis Yt going through the tongue portion parallel to the Yw axis, the bottom wall being located on the opposite side of the tongue portion with respect to the top wall.

Preferably, the bottom wall is inclined with respect to the tongue portion.

Preferably, the service member further comprises a face wall perpendicular to the first side wall, wherein the tongue portion protrudes from the face wall.

Preferably, the first side wall comprises a through-hole for a screw.

Another object of the invention is an assembly comprising a service member as described and a vehicle cooling module, the vehicle cooling module comprising a slot and at least one contact side wall, the service member being attached to the vehicle cooling module so that the tongue portion is introduced into the slot and the first side wall is in contact with the contact side wall.

Another object of the invention is an assembly comprising a service member as described and a vehicle cooling module, wherein the contact side wall comprises a through-hole for a screw coaxial with the through hole of the service member for fixing together the vehicle cooling module and the service member.

BRIEF DESCRIPTION OF THE DRAWINGS

Examples of the invention will be apparent from and described in detail with reference to the accompanying drawings, in which:

FIG. 2 shows the service member in a perspective view;

FIG. 3a shows the service member in top view, with FIG. 3b showing a closer view of the connection portion;

DETAILED DESCRIPTION OF THE INVENTION

Figure 1A:
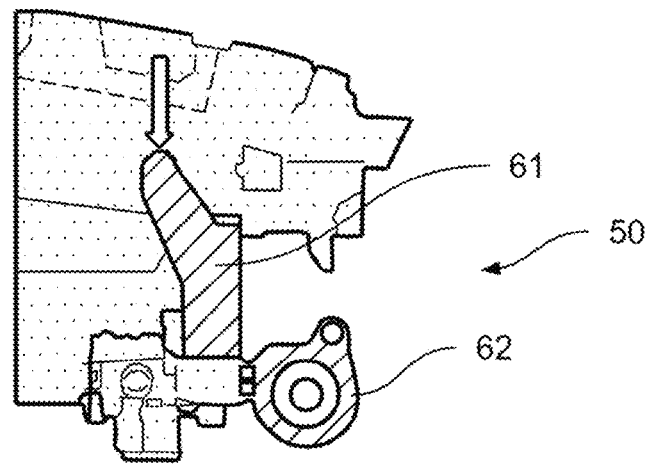
FIG. 1a shows the first stage of the breaking of the mounting assembly and replacement by a service member according to the invention.
Figure 1B:
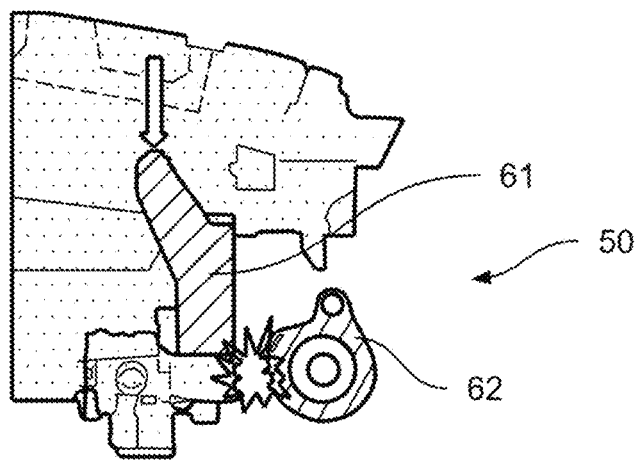
FIG. 1b shows the second stage of the breaking of the mounting assembly and replacement by a service member according to the invention.
Figure 1C:
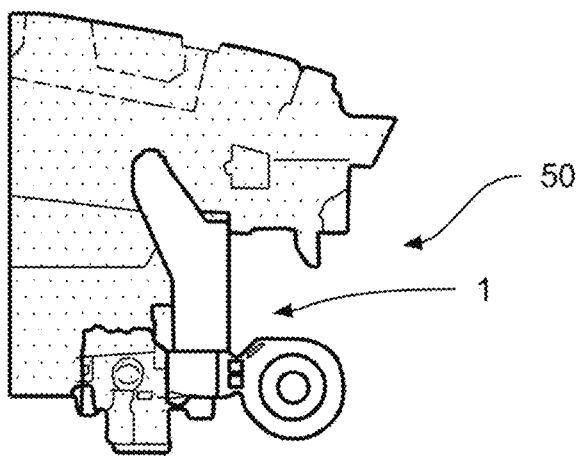
FIG. 1c shows the third stage of the breaking of the mounting assembly and replacement by a service member according to the invention.

FIGS. 1a-1c show breaking of the mounting assembly of a vehicle cooling module 50 and replacement by a service member 1 according to the invention. Once the vehicle hits an object, a force is transferred from a car beam by a crash bumper 61 to the vehicle cooling module 50. A mounting element 62, serving as attachment component of the vehicle cooling module 50 to vehicle's structure, breaks in a predetermined place. If the radiator is not damaged, the crash bumper 61 is removed, the broken area is polished off and a service member 1 is mounted on the cooling module. The details of the service member 1 will be explained below.

FIG. 2 shows the service member 1 in a perspective view. In general, the service member 1 comprises a first element 10 with a bumper portion 11 and a second element 20 connected to the first element 10. The function of the first element 10 is to receive impact from the car beam or other vehicle components. The first element 10 is also used for mounting the service member 1 to the vehicle cooling module 50. The second element 20 is intended for mounting the service member 1 to the vehicle structure. What follows is that the second element 20 serves as a mounting component for the vehicle cooling module 50.

FIGS. 3a and 3b show the service member 1 in top view with a closer view on its connection portion 30. The first element 10 is connected with the second element 20 by a connection portion 30 adapted to controllably break upon imparting a predetermined force to the bumper portion 11. In particular, the connection portion 30 comprises a connecting arm 31 between the first element 10 and the second element 20. Preferably, there is a plurality of connecting arms 31. At least one of the arms 31 has a weakened portion 32 intended to break more easily than the rest of the connecting arms 31. This can be realized by selectively reducing the thickness of the connecting arm 31. In this case, there are three connecting arms 31 connecting the first and second elements 10, 20, wherein the middle one has a weakened portion 32. Thanks to this weakened portion 32 it is possible to control the propagation of the crack line to run only through the connecting arms 31, without going in the direction of either the first element 10 or the second element 20.

Figure 4:
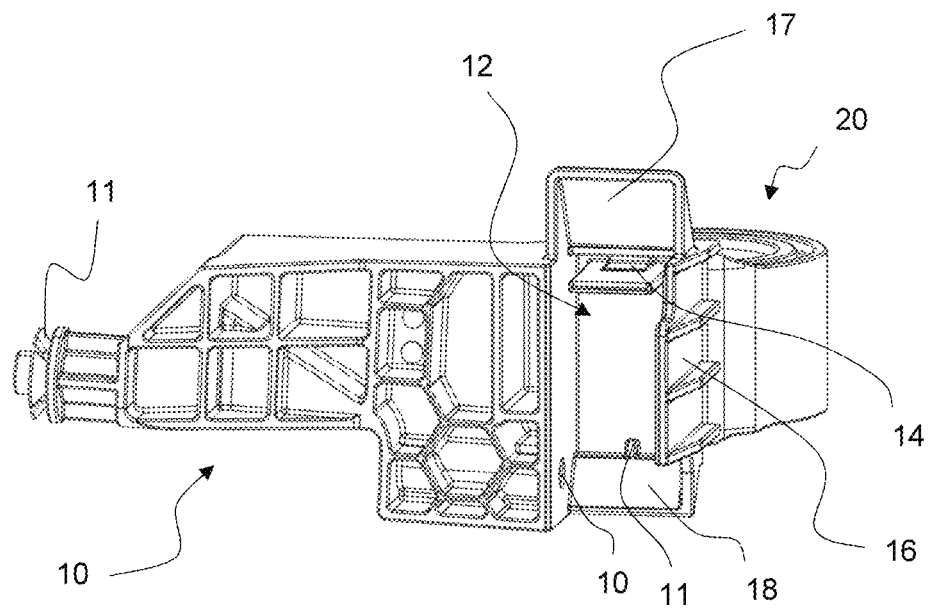
FIG. 4 shows another perspective view of the service member.
Figure 5:
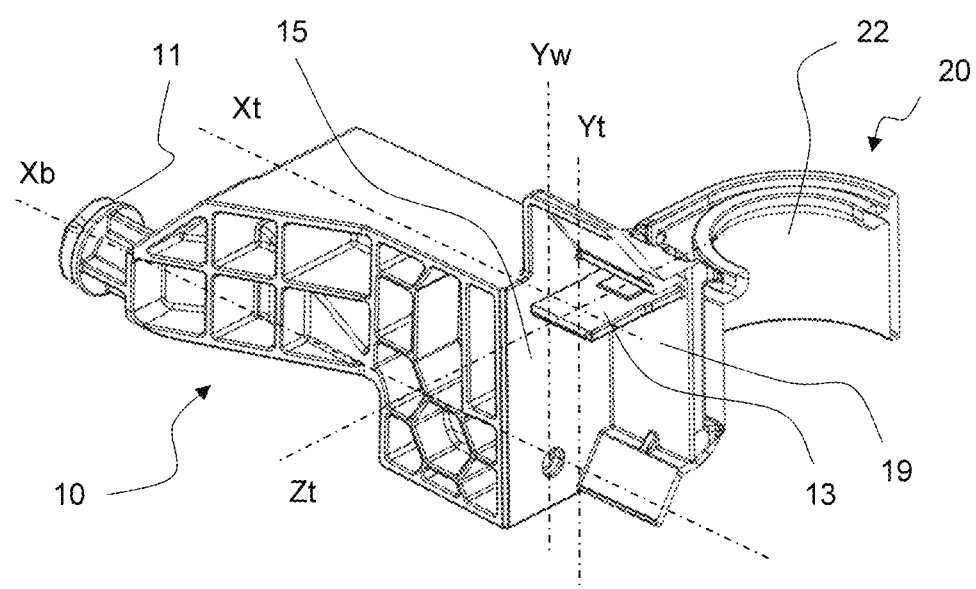
FIG. 5 shows cross-section view of the service member.

FIG. 4 shows another perspective view of the service member 1, while FIG. 5 shows a cross-section view. On the first element 10 there is located a first fixing interface 12 for fixing the service member 1 to the vehicle module 50, while on the second element 20 there is located a second fixing interface 22 for fixing the servicing member 1 to the vehicle structure.

The first fixing interface 12 comprises a tongue portion 13. The tongue portion 13 is adapted for releasable connection with a slot 51 in the vehicle cooling module 50. In other words, the tongue portion 13 is shaped and dimensioned so that it can be inserted into a dedicated slot 51 in the vehicle cooling module 50 so that it is securely attached thereto, while retaining a possibility of detachment. Preferably, the tongue portion 13 is of plate-like shape and rectangular cross-section. The cross-section of the tongue portion 13 can be decreasing along its length for improved securing within the slot 51. The tongue portion 13 can comprise a blocking section 14 adapted for frictional fixing in a slot 51 of a vehicle cooling module 50. This blocking section 14 can be for example locally enlarged thickness.

The first fixing interface 12 comprises a first side wall 15 extending adjacent to the tongue portion 13 between said tongue portion 13 and the bumper portion 11 so that a free space is created between the tongue portion 13 and the side wall 15. In general, the bumper portion 11 is adapted to work along an impact axis Xb, and the tongue portion 13 extends along a tongue axis Zt perpendicular to the impact axis Xb. The first side wall 15 extends along an axis Yw perpendicular to the impact axis Xb and the tongue axis Zt. Preferably, the first side wall 15 is a flat wall which extends from the tongue portion 13 substantially below the tongue portion 13, preferably at a distance at least double the thickness of the tongue portion 13 measured along axis Yt.

As shown in FIG. 5, there is a free space between the tongue portion 13 and the first side wall 15 when viewed along an axis Xt parallel to the impact axis Xb, the axis Xt going through the tongue portion 13.

The service member 1 can further comprise a second side wall 16 extending parallel to the first side wall 15 on the opposite side of the tongue portion 13. Additionally, the service member 1 can further comprise a top wall 17 extending over the tongue portion 13 when looked along an axis Yt going through the tongue portion 13 parallel to the Yw axis. The top wall 17 can be inclined with respect to the tongue portion 13. There can be also a bottom wall 18 extending below the tongue portion 13 when looked along an axis Yt going through the tongue portion 13 parallel to the Yw axis, the bottom wall 18 being located on the opposite side of the tongue portion 13 with respect to the top wall 17. This bottom wall 18 can be inclined with respect to the tongue portion 13. The tongue portion 13 can protrude from a face wall 19 which is perpendicular to the first side wall 13. In any case, there is a space created at least between the tongue portion 13 and the first side wall 15 into which a portion of the vehicle cooling module is introduced for secured connection which enables force transfer upon impact received through the bumper portion 11. Because the force can be transferred securely, the connection portion 30 is allowed to break controllably. This particular design allows to achieve this in a simple and cost effective manner.

The first side wall 15 can comprise a hole 19 for a screw, for example a through-hole, enabling more secure connection to the vehicle cooling module 50.

Figure 6:
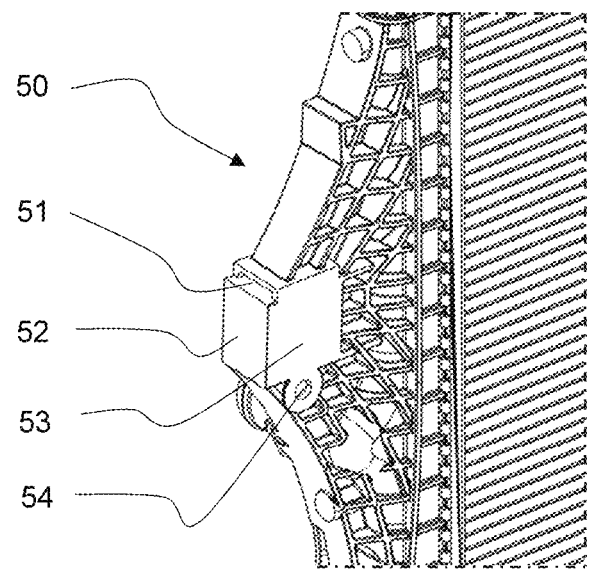
FIG. 6 shows a vehicle cooling module portion after removal of broken mounting assembly.
Figure 7:
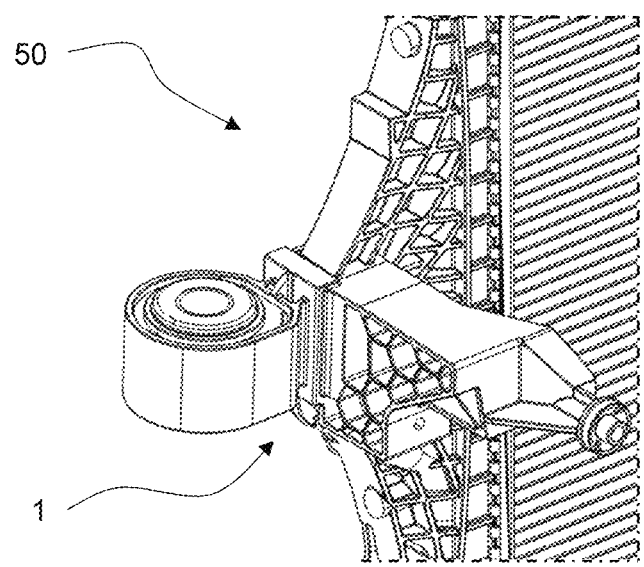
FIG. 7 shows a vehicle cooling module portion with a service member.

FIG. 6 shows the vehicle cooling module 50 portion after removal of broken mounting assembly. In the same perspective, FIG. 7 shows the vehicle cooling module 50 portion with the service member 1. The vehicle cooling module 50, in this case part of a radiator, has a slot 51 and at least one contact side wall 53. When the service member 1 is attached to the vehicle cooling module 50, the tongue portion 13 is introduced into the slot 51 and the first side wall 15 is in contact with the contact side wall 53. In this manner, a secure arrangement is created between the cooling module 50 and the service member 1. Preferably, the vehicle cooling module 50 comprises also a front contact wall 52 which after assembly is facing, and preferably is in contact, with the face wall 19 of the service member 1. If there is a plurality of contact walls on the vehicle cooling module 50 as shown in FIG. 6, the service member 1 can in fact encapsulate them and a correct positioning of the service member can be ensured after inserting the tongue portion 13 into the slot 51 of the vehicle cooling module 50. The inclined top wall 17 and bottom wall 18 can follow the shape of the vehicle cooling module 50 for better alignment and protection of the connection. In FIG. 7, the top wall 17 is not inclined.

The contact side wall 53 can comprise a hole or a through-hole 54 for a screw coaxial with the through hole 19 of the service member 1 for fixing together the vehicle cooling module 50 and the service member 1 in a secured manner. In such case, a screw is inserted into both of the openings after assembly, and removed if needed for another replacement of the servicing member if another crash occurs.

In any case, the service member 1 after assembly and upon crash will break within the connection area 30. The components thereof can then be removed and another servicing member 1 can be mounted.

Other variations to the disclosed embodiments can be understood and effected by those skilled in the art in practicing the claimed invention, from a study of drawings, the disclosure, and the appended claims. The mere fact that certain measures are recited in mutually different dependent claims does not indicate that a combination of these measures cannot be used to the advantage.

What is claimed is:

1. A servicing member for a vehicle cooling module, comprising a first element with a bumper portion, a first fixing interface located on the first element for fixing to the vehicle cooling module, a second element connected to the first element, a second fixing interface located on the second element for fixing the servicing member to a vehicle structure, wherein the first element is connected with the second element by a connection portion adapted to controllably break upon imparting a predetermined force to the bumper portion, wherein the first fixing interface includes a tongue portion, the tongue portion being adapted for releasable connection with slot in the vehicle cooling module, the first fixing interface including a first side wall extending adjacent to the tongue portion between said tongue portion and the bumper portion so that a free space is created between the tongue portion and the first side wall.

2. The servicing member according to claim 1, wherein the tongue portion is of plate shape and rectangular cross-section.

3. The servicing member according to claim 1, wherein the tongue portion includes a blocking section adapted for frictional fixing in the slot of the vehicle cooling module.

4. The servicing member according to claim 1, wherein the bumper portion is adapted to work along ane impact axis, and the tongue portion extends along a tongue axis perpendicular to the impact axis.

5. The servicing member according to claim 4, wherein the first side wall extends along an axis perpendicular to the impact axis and the tongue axis.

6. The servicing member according to claim 1, further including a second side wall extending parallel to the first side wall on the opposite side of the tongue portion.

7. The servicing member according to claim 4, further including a top wall extending over the tongue portion when viewed along an axis going through the tongue portion parallel to the axis perpendicular to the impact axis and the tongue axis.

8. The service member according to claim 7, wherein the top wall is inclined with respect to the tongue portion.

9. The servicing member according to claim 7, further including a bottom wall extending below the tongue portion when viewed along an axis going through the tongue portion parallel to the axis perpendicular to the impact axis and the tongue axis, the bottom wall being located on the opposite side of the tongue portion with respect to the top wall.

10. The service member according to claim 9, wherein the bottom wall is inclined with respect to the tongue portion.

11. The service member according to claim 1, further including a face wall perpendicular to the first side wall, wherein the tongue portion protrudes from the face wall.

12. The service member according to claim 1, wherein the first side wall includes a through-hole for a screw.

13. An assembly comprising:
a servicing member for a vehicle cooling module, comprising a first element with a bumper portion, a first fixing interface located on the first element for fixing to the vehicle module, a second element connected to the first element, a second fixing interface located on the second element for fixing the servicing member to a vehicle structure, wherein the first element is connected with the second element by a connection portion adapted to controllably break upon imparting a predetermined force to the bumper portion, wherein the first fixing interface includes a tongue portion, the tongue portion being adapted for releasable connection with a slot in the vehicle cooling module, the first fixing interface including a first side wall extending adjacent to the tongue portion between said tongue portion and the bumper portion so that a free space is created between the tongue portion and the first side wall,
and a vehicle cooling module,
the vehicle cooling module including a slot and at least one contact side wall, the service member being attached to the vehicle cooling module so that the tongue portion is introduced into the slot and the first side wall is in contact with the contact side wall.

14. The assembly according to claim 13, wherein the contact side wall includes a hole for a screw coaxial with the through-hole of the service member for fixing together the vehicle cooling module and the service member.

* * * * *